(12) United States Patent
Miller

(10) Patent No.: US 7,322,246 B2
(45) Date of Patent: Jan. 29, 2008

(54) PRESSURE SENSOR WITH PRESSURE TRANSLATION

(75) Inventor: Bree L. Miller, Knoxville, TN (US)

(73) Assignee: IP Development, LLC, Knoxville, TN (US)

( * ) Notice: Subject to any disclaimer, the term of this patent is extended or adjusted under 35 U.S.C. 154(b) by 76 days.

(21) Appl. No.: 11/183,365

(22) Filed: Jul. 18, 2005

(65) Prior Publication Data

US 2005/0252300 A1    Nov. 17, 2005

Related U.S. Application Data

(63) Continuation-in-part of application No. 10/459,669, filed on Jun. 11, 2003, now Pat. No. 6,919,521, which is a continuation-in-part of application No. 10/096,566, filed on Mar. 13, 2002, now Pat. No. 6,580,042.

(51) Int. Cl.
*G01L 7/08* (2006.01)
(52) U.S. Cl. .......................................... 73/715; 200/83
(58) Field of Classification Search ................ 73/700, 73/702, 703; 137/85; 200/83
See application file for complete search history.

(56) References Cited

U.S. PATENT DOCUMENTS

| | | |
|---|---|---|
| 4,007,343 A | 2/1977 | Alten |
| 4,265,124 A | 5/1981 | Lim et al. |
| 4,546,785 A * | 10/1985 | Sanderford ............... 137/85 |
| 5,142,912 A | 9/1992 | Frische |
| 5,177,579 A | 1/1993 | Jerman |
| 5,275,035 A | 1/1994 | Baer |
| 5,619,022 A | 4/1997 | Long |
| 5,708,245 A | 1/1998 | Werner et al. |
| 6,117,086 A | 9/2000 | Shulze |
| 6,125,218 A | 9/2000 | Humphrey |
| 6,311,561 B1 | 11/2001 | Bang et al. |
| 6,580,042 B1 | 6/2003 | Miller et al. |

OTHER PUBLICATIONS

Youngmin Kim & Dean P. Neikirk, Fabry-Perot Based Pressure Transducers (6 pp), http://www.wave.mer.utexas.exu/MED_files/MED_research/F_P_sensor_.html.

* cited by examiner

*Primary Examiner*—Andre J. Allen
(74) *Attorney, Agent, or Firm*—Pitts & Brittian, PC

(57) ABSTRACT

A pressure sensor integrated onto an electronic circuit substrate. The pressure sensor measures the effect of the ambient air pressure on a characteristic of the pressure sensor that can be translated into a variable pressure measurement. Another embodiment of the pressure sensor is a pressure switch having a set point that can be configured at, or after, the time of installation of the associated circuit substrate.

6 Claims, 17 Drawing Sheets

PRESSURE SENSOR WITH PRESSURE TRANSLATION

CROSS-REFERENCE TO RELATED APPLICATIONS

This application is a continuation-in-part of U.S. application Ser. No. 10/459,669, filed Jun. 11, 2003, now U.S. Pat. No. 6,919,521, which is a continuation-in-part of U.S. application Ser. No. 10/096,566, filed Mar. 13, 2002, now U.S. Pat. No. 6,580,042.

STATEMENT REGARDING FEDERALLY SPONSORED RESEARCH OR DEVELOPMENT

Not Applicable.

BACKGROUND OF THE INVENTION

1. Field of Invention

The present invention relates to the field of pressure sensors. More specifically, the present invention relates to a pressure sensor integrated onto a circuit substrate.

2. Description of the Related Art

Pressure sensors are known to those skilled in art. Typically, these devices fall into two categories. In the first category are set-point pressure sensors, more properly referred to as pressure switches, that actuate when a specified pressure is reached. The second category contains the more sophisticated pressure sensors that are capable of measuring the ambient pressure and reacting accordingly. Generally, pressure switches are less complex and more cost efficient than pressure sensors.

In low tire pressure warning systems, a typical mass-market application, the critical function of the warning system is to identify when the tire pressure falls below a specified value. Accordingly, using a pressure sensor with the ability to measure the tire pressure adds extra expense to the system.

FIG. 1 illustrates an exploded view of a conventional pressure switch. The conventional pressure switch includes a base member 11 having tabs 12 for securing the conventional pressure switch on a circuit board. Connected to the base member 11 is a metal enclosure 13. A hollow contact pin 14 passes through an opening in the base of the metal enclosure 13 and allows the pressure of and/or the gas within the pressure switch to be changed. A non-conductive end piece 15 serving as a diaphragm support is attached to the end of the contact pin 14 terminating within the metal enclosure 13. A thin metal diaphragm 17 covers the open end of the metal enclosure 13. A metal spring 16 biases the end piece 15 and the contact pin 14 against the diaphragm 17. The metal spring 16, in combination with the hollow contact pin 14, is selected to set the pressure at which the switch responds. A cover 18 having a small, central through opening 19 provides protection for the diaphragm 17.

BRIEF SUMMARY OF THE INVENTION

An apparatus integrated onto an electronic circuit substrate, which may be a circuit board or a semiconductor-based product for measuring the ambient pressure, a pressure sensor, or sensing when the ambient pressure reaches a specified value, a pressure switch, is shown and described. The pressure switch is considered to be a subset of the general pressure sensor. The pressure sensor is low profile and reliable. When implemented as a pressure switch, it has a set point that can be configured at, or after, the time of installation of the associated circuit substrate. Further, the pressure sensor can contain other electrical components to conserve valuable circuit substrate real estate and allow the construction of self-contained electronic pressure sensors.

In one embodiment, the pressure sensor is an absolute pressure switch including a fluid-tight sealed enclosure having one surface that acts as a diaphragm. At least one other surface of the pressure sensor is formed from a circuit substrate. The internal volume of the pressure switch is typically small and is maintained at the atmospheric pressure where and when the pressure sensor is sealed. Variations in the ambient air pressure relative to the internal pressure force the diaphragm to move thereby making or breaking contact with an electrical conductor that completes the switch. Finally, the internal volume can be filled with either atmospheric gases or with an inert gas selected to prevent oxidation or to change the set point characteristics.

In both the pressure sensor and the pressure switch, the diaphragm is secured to the open end of the enclosure in a fluid-tight manner, completing the sealed enclosure. The diaphragm is constructed from an electrically conductive, flexible material. The diaphragm includes a series of concentric grooves to provide extra flexibility such that the diaphragm can move without deformation. Both the top and bottom surfaces of the diaphragm are provided with a set of concentric grooves. Within each set, the concentric grooves are equally spaced; however, the top set and the bottom set are offset from one another. The present inventors have found that this arrangement provides increased flexibility and responsiveness in the diaphragm. The diaphragm is designed to exhibit flexibility and allow movement in response to a pressure differential between the ambient pressure and the internal pressure of the pressure sensor.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An apparatus integrated onto an electronic circuit substrate for sensing the ambient pressure, or pressure sensor, is described and shown generally at 10 in the figures. The pressure sensor 10 measures the ambient pressure based on perturbations of a known characteristic caused by flexing of a diaphragm exposed to the ambient pressure. The pressure sensor 10 is adaptable to trip when the ambient pressure reaches a specified value, in effect operating as a pressure switch. The pressure sensor 10 is low profile and reliable. When configured as a pressure switch, the pressure sensor has a set point that can be configured at, or after, the time of installation of the associated circuit substrate. Further, the pressure sensor 10 can contain other electrical components to conserve valuable circuit substrate real estate and allow the construction of self-contained electronic pressure sensors. As used herein, pressure switch is a subset of the more general class of pressure sensors with the basic structure of the pressure switches and the pressure sensors being substantially similar. The difference between the pressure sensor and the pressure switches being the type of detection components used therein.

Figure 1:
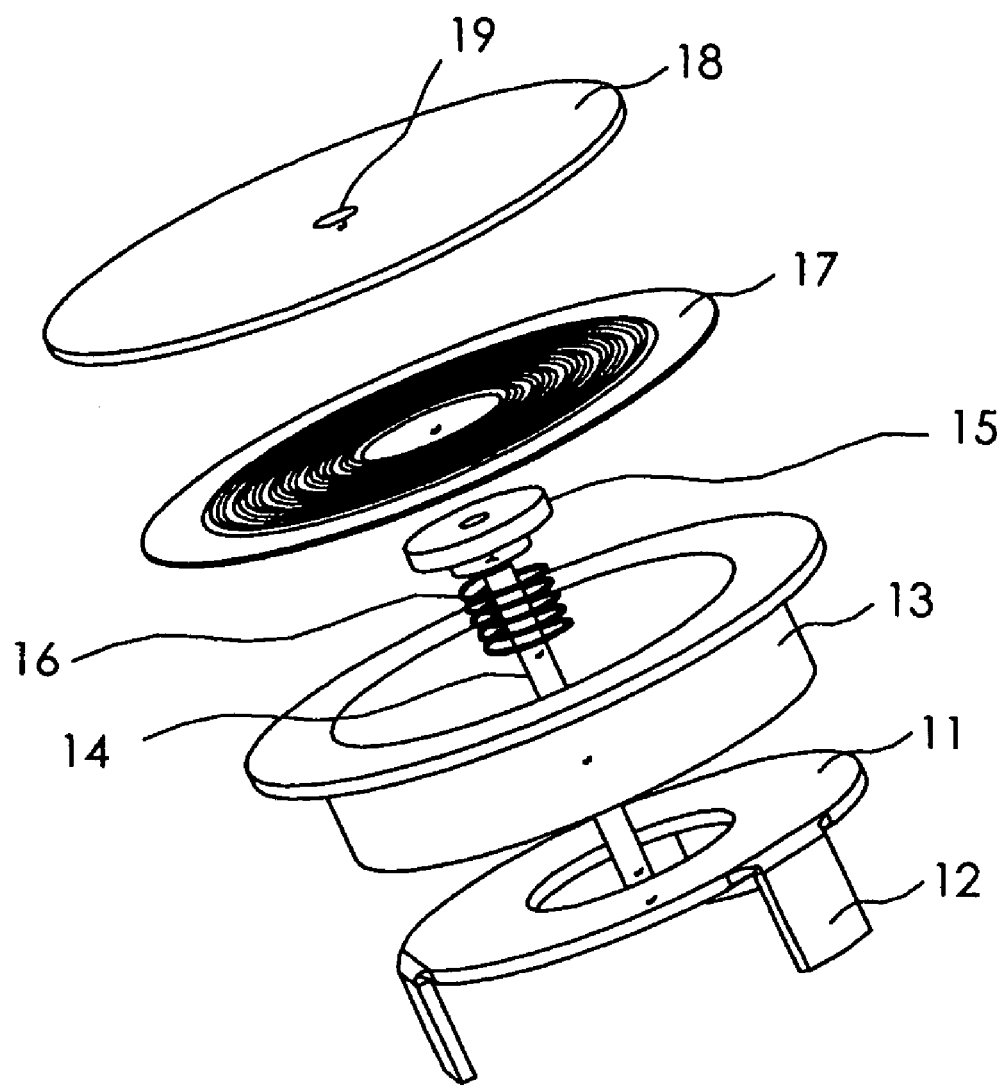
FIG. 1 illustrates a conventional pressure switch according to the prior art.
Figure 2:
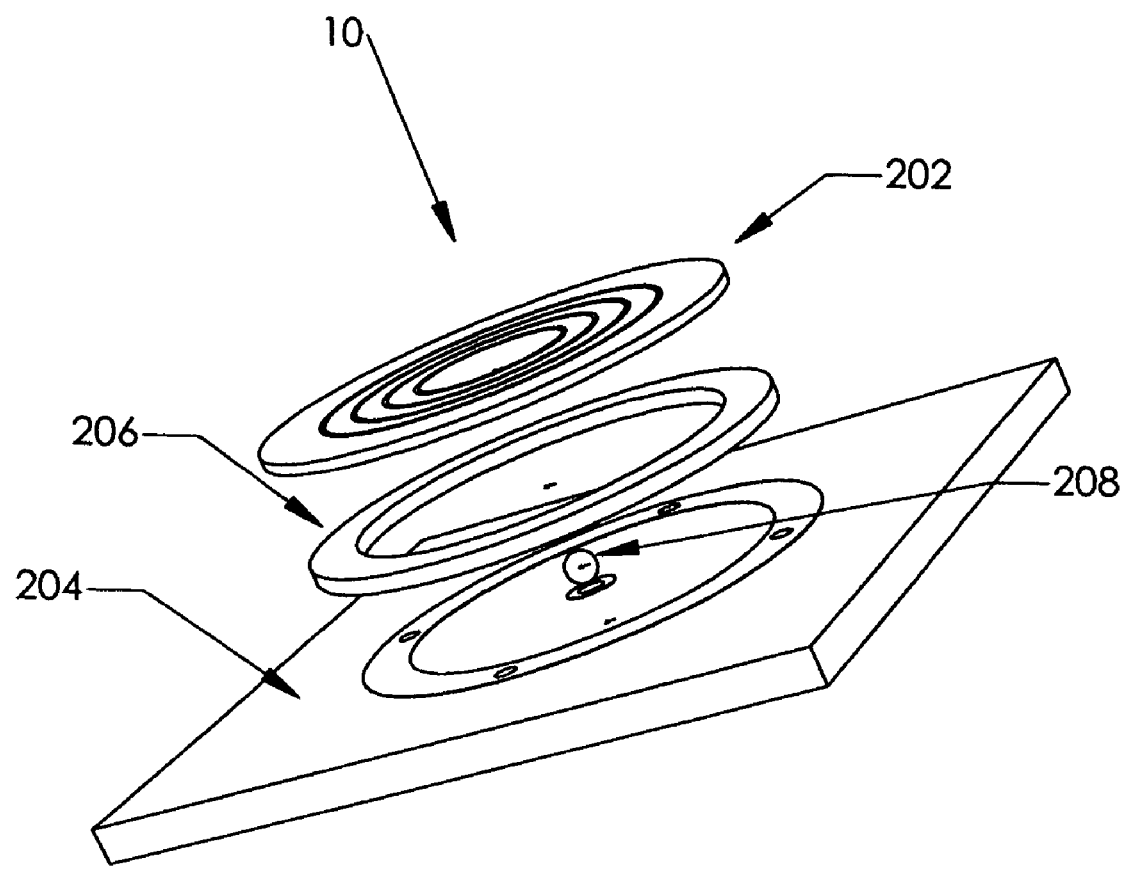
FIG. 2 illustrates one embodiment of a circuit substrate integrated pressure switch.

FIG. 2 illustrates a circuit substrate integrated pressure switch 10 of the present invention. The pressure switch 10 is an absolute pressure switch including a fluid-tight sealed enclosure having one surface that acts as a diaphragm 202. At least one other surface of the pressure switch is formed from a circuit substrate 204. In the illustrated embodiment, the enclosure is built using a spacer ring 206. The internal volume of the pressure switch 10 is typically small and is maintained at the atmospheric pressure where and when the pressure switch 10 is sealed. Variations in the ambient air pressure flex the diaphragm 202 thereby making or breaking contact with an electrically conductive member 208 that completes the pressure switch 10. In the illustrated embodiment, the conductive member 208 has a substantially spherical shape and the circuit substrate is shown as a printed circuit board (PCB).

Figure 8:
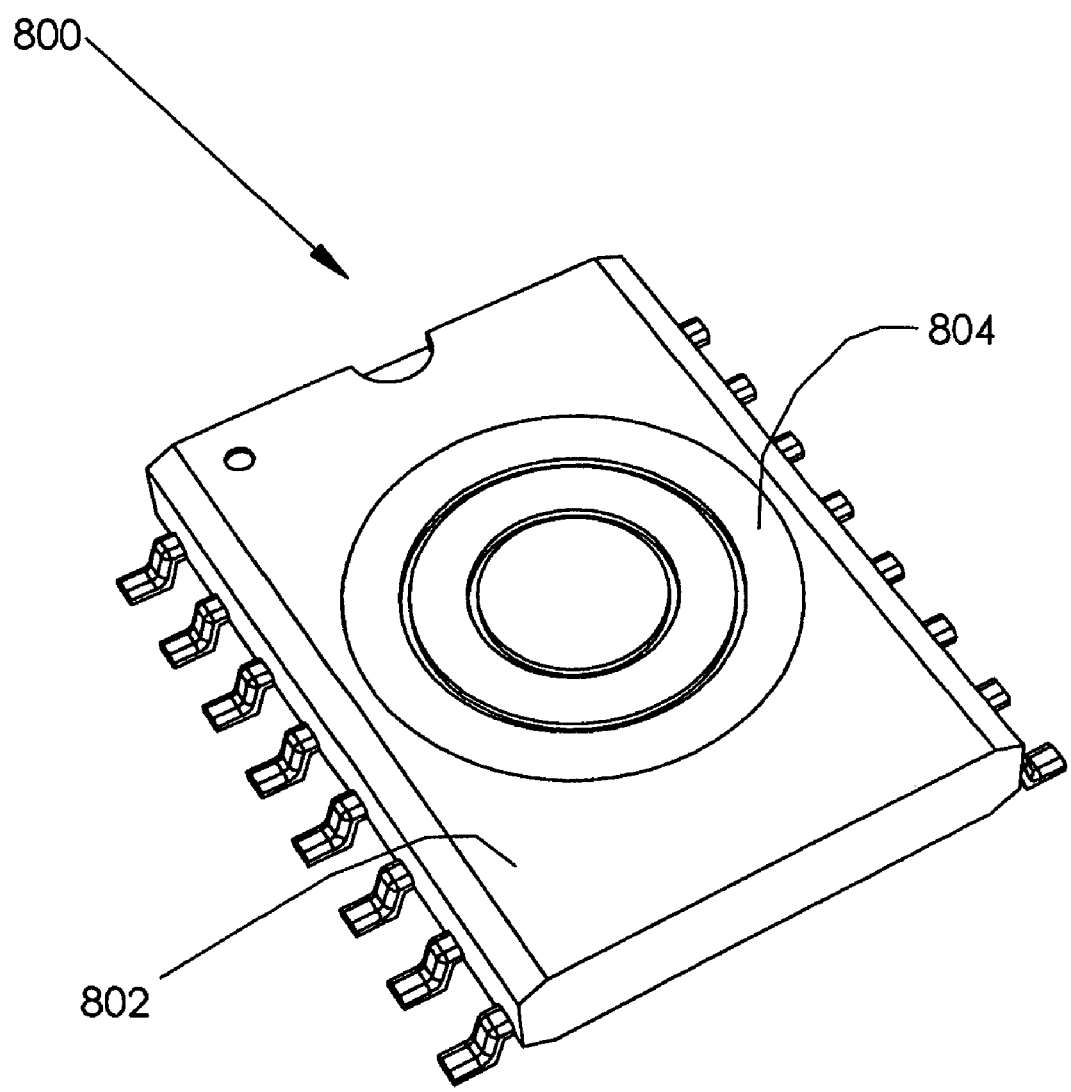
FIG. 8 is a perspective view of a pressure sensor fabricated in a dual inline package integrated circuit.

The term circuit substrate is intended to refer to any circuit substrate upon which a circuit can be formed, including semiconductor materials and printed circuit boards. More specifically, the use of the term circuit substrate is intended to cover integrated circuit implementations using common miniaturization techniques, for example, large-scale integration and very large-scale integration. FIG. 8 illustrates an integrated circuit implementation of the pressure sensor 800. In the illustrated embodiment, the integrated circuit is a common dual inline package 802. The diaphragm 804 is exposed in a manner similar to that employed when exposing the window of an electrically erasable programmable read-only memory or a photosensitive element in a integrated circuit based photosensor. The use of other available package types for integrated circuit implementations of the pressure sensor will be appreciated by those skilled in the art. Those skilled in the art will also recognize that applicability of the fabrication of the pressure sensor or pressure switch in a microelectromechanical system.

Figure 3:
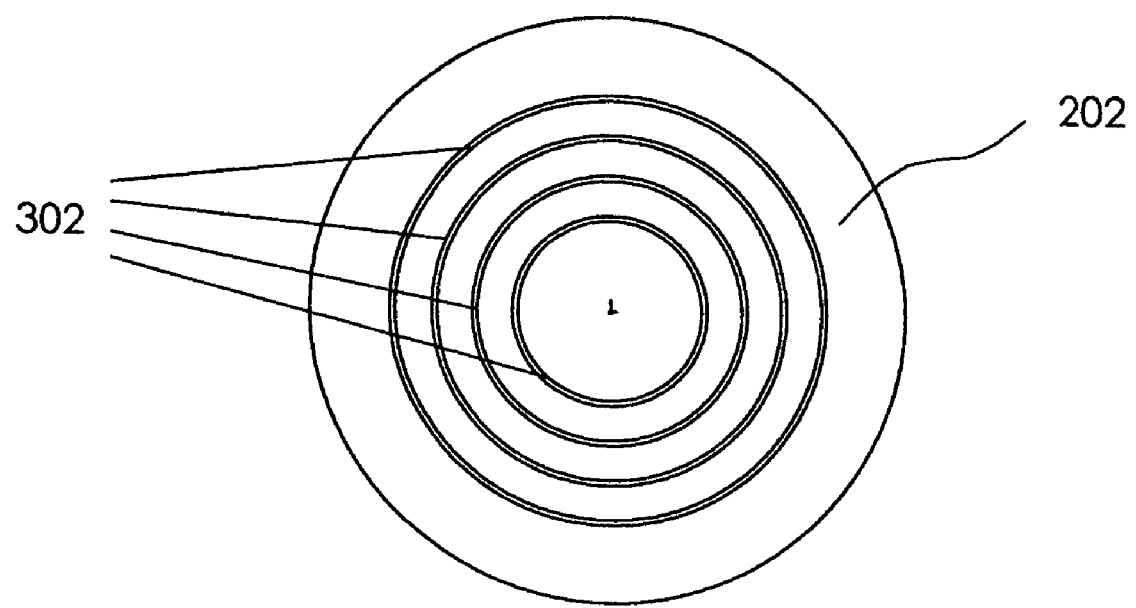
FIG. 3 is a top plan view of a diaphragm for use with a pressure sensor.

FIG. 3 illustrates a top plan view of the diaphragm 202. The diaphragm 202 is constructed from an electrically conductive, flexible material, such as a spring temper metal, i.e., phosphorous bronze. In the illustrated embodiment, the diaphragm 202 has a circular shape. Those skilled in the art will recognize that the diaphragm can be constructed from other materials exhibiting the desired flexibility and could have other shapes without departing from the spirit and scope of the present invention. The diaphragm 202 includes a series of concentric grooves 302 to provide extra flexibility such that the diaphragm can move without deformation. One method of creating the grooves 302 is by chemically etching the diaphragm. Those skilled in the art will recognize that other methods of creating the grooves 302, including stamping and other machining techniques, can be used without departing from the spirit and scope of the present invention.

Figure 4:
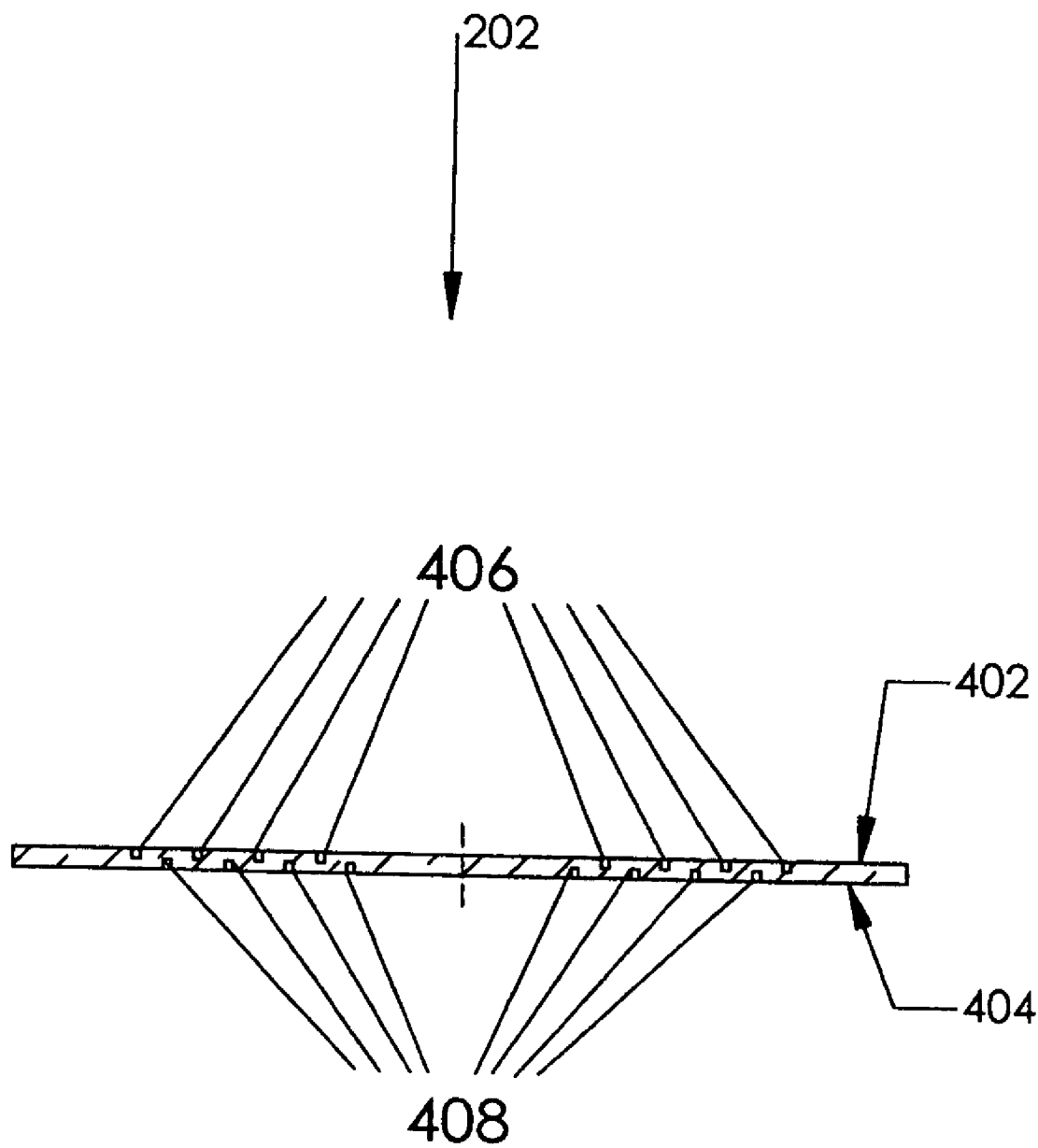
FIG. 4 is a sectional view of the diaphragm of FIG. 3.

FIG. 4 illustrates a cross-section of the diaphragm 202 shown in FIG. 3. In the illustrated embodiment, both the top 402 and bottom surface 404 of the diaphragm are provided with a set of concentric grooves 406, 408. Within each set 406, 408, the concentric grooves are equally spaced; however, the top set 406 and the bottom set 408 are offset from one another. The present inventors have found that this arrangement provides increased flexibility and responsiveness in the diaphragm 202. In the illustrated embodiment, the top set 406 and the bottom set 408 are offset by one-half of the groove spacing. Those skilled in the art will recognize that other groove patterns, groove spacings, and groove offsets can be used without departing from the spirit and scope of the present invention. The diaphragm 202 is designed to exhibit flexibility and allow movement in response to a pressure differential between the ambient pressure and the internal air pressure of the pressure sensor 10.

Figure 5:
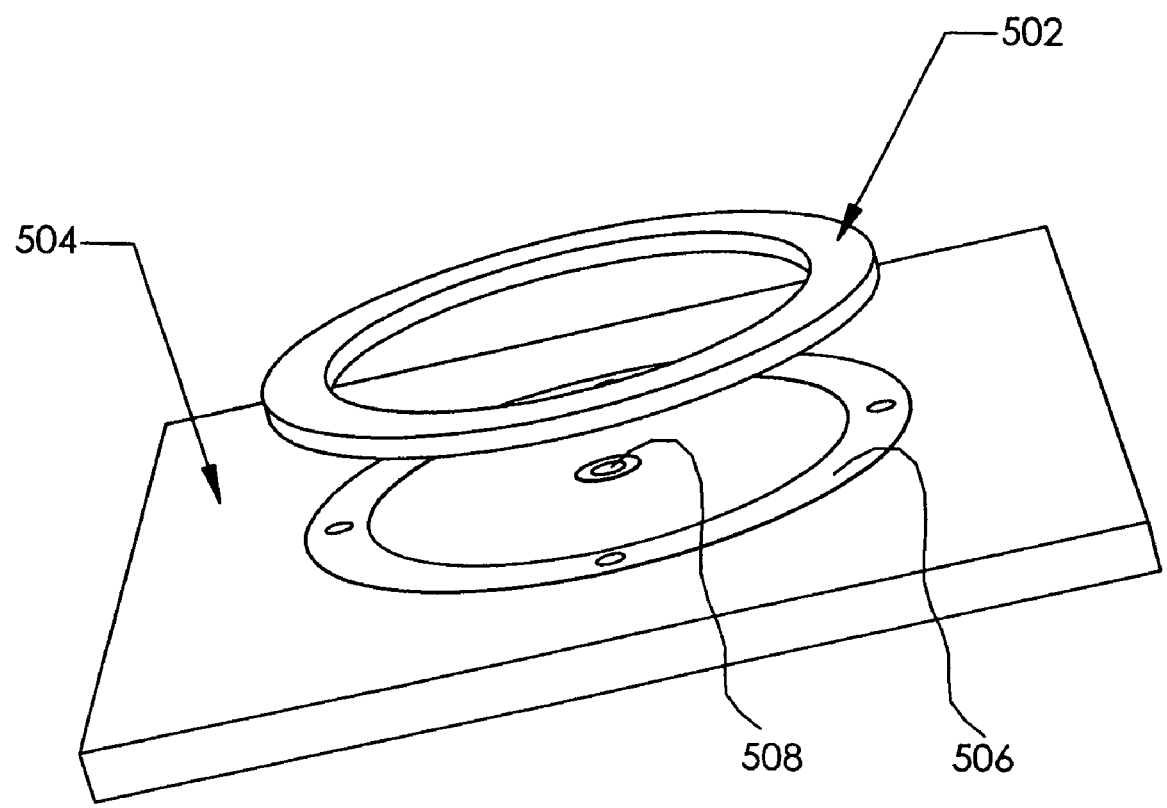
FIG. 5 illustrates, in partial section, one embodiment of the pressure switch of the present invention.

FIG. 5 illustrates one embodiment in which the pressure sensor 10 includes at least one ring 502 stacked on the surface of the circuit substrate 504 to create an open-ended enclosure having the desired volume. In the illustrated embodiment, the enclosure is a cylinder with the circuit substrate forming the base of the enclosure. A trace 506 matching the shape of the enclosure is printed on the circuit substrate to define the enclosure position. The material from which the rings 502 are formed is not critical; however, the rings 502 are typically solid metal or metal laminated. A solder paste coating on the rings 502 provides the sealing mechanism when heated and serves to form a gas-impermeable barrier when semi-porous materials are used. The solder paste-coated rings 502 are permanently seated on the circuit substrate 504 by placing the circuit substrate in a reflow oven. The present inventors have found that the rings 502 substantially align as the solder paste flows during heating and that no special alignment effort is necessary to achieve a sealed enclosure. Those skilled in the art will recognize that, while rings 502 and a generally cylindrical enclosure are described herein, other shapes may be used without departing from the scope and spirit of the present invention. The diaphragm serves as the top of the enclosure and flexes in response to the ambient pressure. The flex of the diaphragm provides a mechanism to perform switching based upon ambient pressure and to vary a characteristic of the pressure sensor which can be translated into a variable pressure measurement.

The circuit substrate defines a through opening 508 providing access to the interior of the enclosure. The through opening 508 is dimensioned to receive a conductive member that serves to define the set point of the pressure switch. It is desirable, but not necessary, for the conductive member to be constructed from the same metal as the diaphragm. This reduces the effect of galvanic corrosion. In addition, those skilled in the art will recognize that the electric connection can be maximized by increasing the contact geometry between the conductive member and the diaphragm. One method of achieving the increased contact area when using an elongated conductive member is to shear the contact end of the member such that it presents a flat surface normal to the diaphragm.

Figure 6:
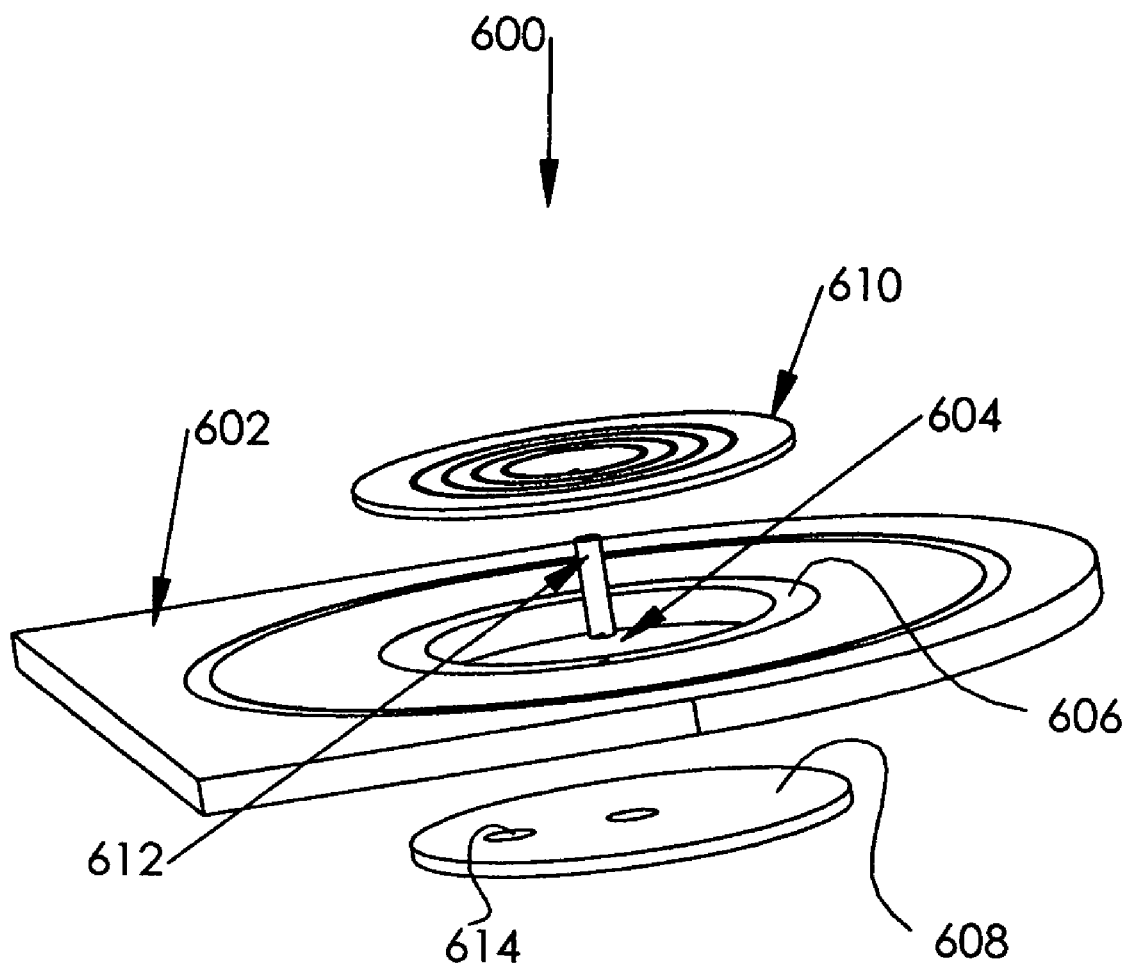
FIG. 6 illustrates, in partial section, an alternate embodiment of the pressure switch of the present invention.

In another embodiment, illustrated in FIG. 6, the enclosure of the pressure switch 600 is formed using the thickness of the circuit substrate 602. In this embodiment, the circuit substrate 602 defines a large diameter through opening 604. A trace 606 is etched around the edges of the through opening 604 which cooperates with the solder paste to provide the sealing function. A base plate 608 is secured to one side of the circuit substrate 602 and a diaphragm 610 is secured to the opposite side of the circuit substrate 602 to seal the through opening 604 in a fluid-tight manner. The base plate 608 defines a contact opening adapted to receive a conductive member 612. The end of the conductive member 612 is positioned at a distance relative to or in contact with the diaphragm 610 while the pressure switch 600 is under pressure to define the appropriate set point. The conductive member 612 is secured in a fluid-tight manner, e.g., soldered into place.

The embodiment of FIG. 6 further defines a separate pressure valve opening 614. The pressure valve opening 614 is used to establish the internal pressure of the pressure switch and to facilitate the exchange of gases within the pressure switch. For many applications, the pressure switch 600 can operate using standard atmospheric gases; however, those skilled in the art will recognize that the internal volume of the pressure switch 600 can be filled with an inert gas to prevent oxidation. The pressure valve opening 614 facilitates changes to the internal pressure or fill gas that are independent of the positioning of the conductive member 612. Once the desired internal pressure or internal gas is established, the pressure valve opening 614 is sealed in a fluid-tight manner. Those skilled in the art will recognize that the pressure valve opening 614 can be closed in a permanent manner, preventing later modifications, or temporary manner, facilitating later modifications, without departing from the spirit and scope of the present invention. Further, those skilled in the art will recognize that the features provided by the pressure valve opening 614 can be achieved using the contact opening, thereby obviating the need for multiple fluid-tight seals to be maintained.

In the embodiment illustrated in FIG. 6, the conductive member is an elongated member such as a wire or pin. To assign a set point, the pressure switch is placed under pressure. Typically this is achieved by applying a calibrated pressure on the diaphragm to induce movement. The conductive member is then inserted through the through opening in the bottom of the volume until it is brought in contact with the distended bottom surface of the diaphragm and soldered into place to create a fluid-tight seal. When pressure is released, the diaphragm returns to an unflexed position thereby placing the pressure switch into its normal state. Depending upon the application, the pressure switch can be configured to react when the ambient pressure either goes above or below a selected set point. For example, in the application of a low tire pressure warning system, the pressure switch is set at the desired warning pressure. While the tire pressure exceeds the set point of the pressure switch, i.e., a positive pressure differential, the pressure switch remains closed. As the tire pressure decreases and approaches the warning pressure, the diaphragm of the pressure switch deflects outwardly in response to the lowering of the ambient pressure. In this condition, the pressure switch opens signaling that the tire pressure is low. Conversely, in an application that requires monitoring of an increase in the ambient air pressure above a particular set point, the pressure switch is higher and the switch remains normally open. When the ambient air pressure equals or exceeds the set point pressure, the diaphragm deflects inwardly and the pressure switch closes.

In an alternate embodiment, such as illustrated in FIG. 2, the conductive member has a substantially spherical shape. To produce a highly accurate and precise pressure switch, the conductive member is a precision ball bearing ground to specification. However, other substantially spherically shaped conductive members can be used with departing from the scope and spirit of the present invention. The set point of the pressure switch is adjusted without the need to apply an external pressure to the pressure switch. Specifically, the set point is adjusted by selecting a bearing of a desired diameter which corresponds to a set point for a pressure switch of particular dimensions. The bearing is sealed in the through opening of the enclosure. Alternately, the diameter of the bearing can remain constant and the diameter of the enclosure through opening can be varied to change the height at which the bearing sits relative to the diaphragm. The use of a bearing for the conductive member simplifies final assembly of the pressure switch. Further, if the diameter of the through opening is used as the set point variable, the required assembly inventory is minimized.

Figure 7:
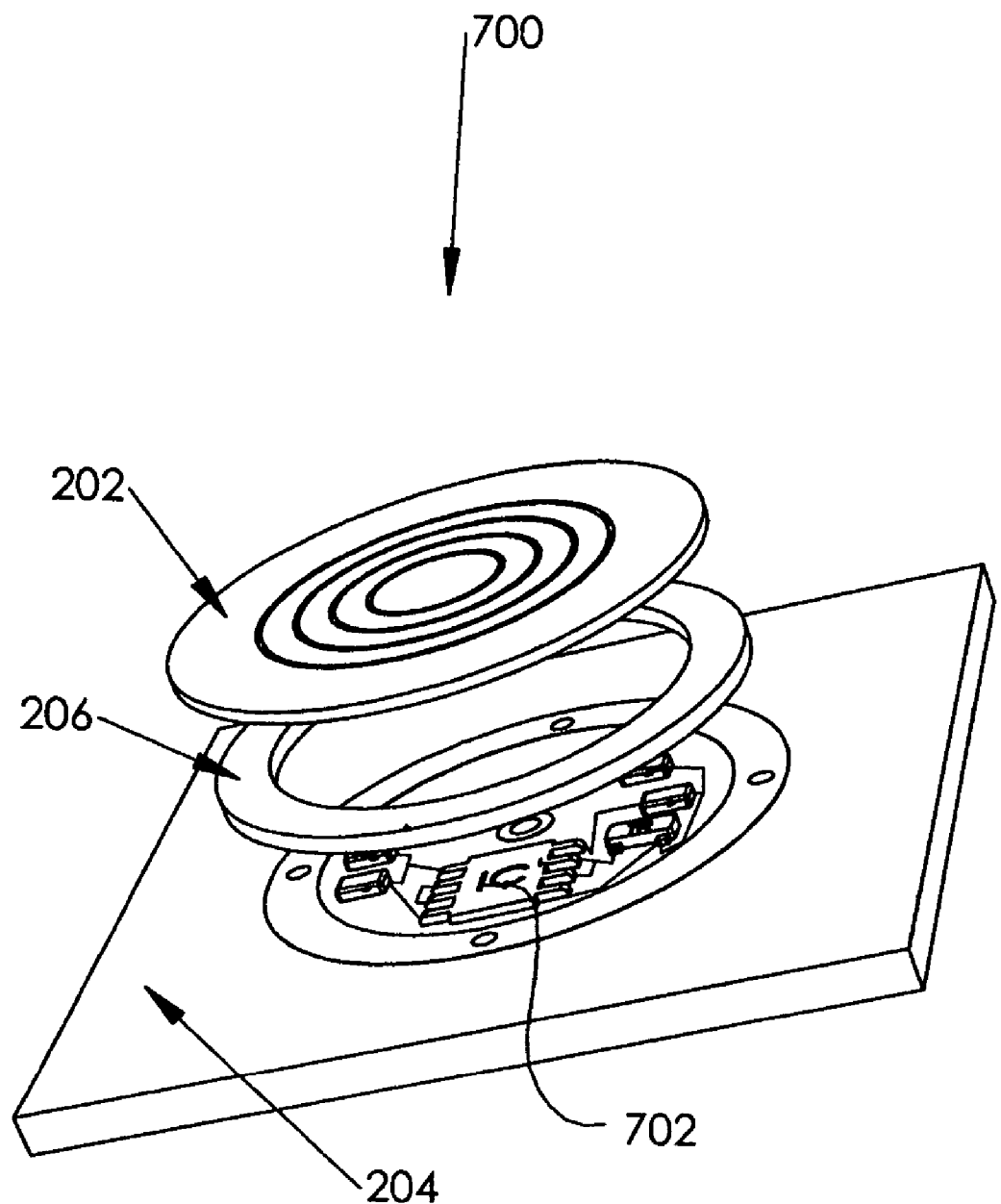
FIG. 7 illustrates a pressure switch of the present invention including internal circuitry.

FIG. 7 illustrates an exploded view of an alternate embodiment of the pressure switch 700 including internal circuitry 702 not necessarily related to the operation of the pressure switch 700. The components and traces that are disposed within the volume of the enclosure do not interfere with the operation of the pressure switch. Accordingly, by locating components and traces on the circuit substrate real estate internal to the enclosure of the pressure switch, miniaturization and protection of the circuit is realized.

In another embodiment, two pressure switches are disposed back-to-back to provide a range over which the pressure switch operates. Typically, such an arrangement would involve a multi-layer circuit substrate with a central conductor. Two opposing enclosures would be formed each having its own contact member, and diaphragm. By configuring the dual pressure switch with two set points, the pressure switch effectively operates to monitor a pressure with a certain range. Such an arrangement can also be used to monitor two related pressures, such as a warning pressure and a critical pressure.

Thus far, the pressure switches described herein are implemented utilizing manual/mechanical method of calibration, i.e., establishing a set-point by the positioning of a conductive pin or the selection of a sphere of a specified diameter. Alternatively, the pressure switch can be calibrated electronically with no mechanical intervention other than an initial calibration pressure applied to the system. For example, when the initial calibration pressure is applied to the pressure switch, the electronics are set in a mode that stores the frequency reading. The values read during the calibration are stored in a memory element. Those skilled in the art will appreciate the use of non-volatile memory elements, such as an electrically erasable programmable read only memory (EEPROM) or any of the common memory card formats in use and the use of registers or other holding units in processing devices, which may be coupled with other types of memory elements. This initial frequency reading serves as the initial calibration point. The controller calculates the correct conversion of the initial frequency to a pressure value based upon known control constants. Those skilled in the art will recognize that multiple calibration points, such as calibrations at the upper and lower end of the detection range, can be established in the same manner. The initiation of the calibration mode is accomplished using techniques known to those skilled in the and depending upon the environment where the pressure switch is located. Such techniques include manual activation of an accessible switch, remote control, programmatic control. An example of one common technique is the use of a magnetic reed switch to trigger a calibration mode on a pressure switch located inside a tire. Those skilled in the art will recognize that the electrical calibration techniques described herein can be used with any of the pressure switch or pressure sensor embodiments described herein.

Figure 9:
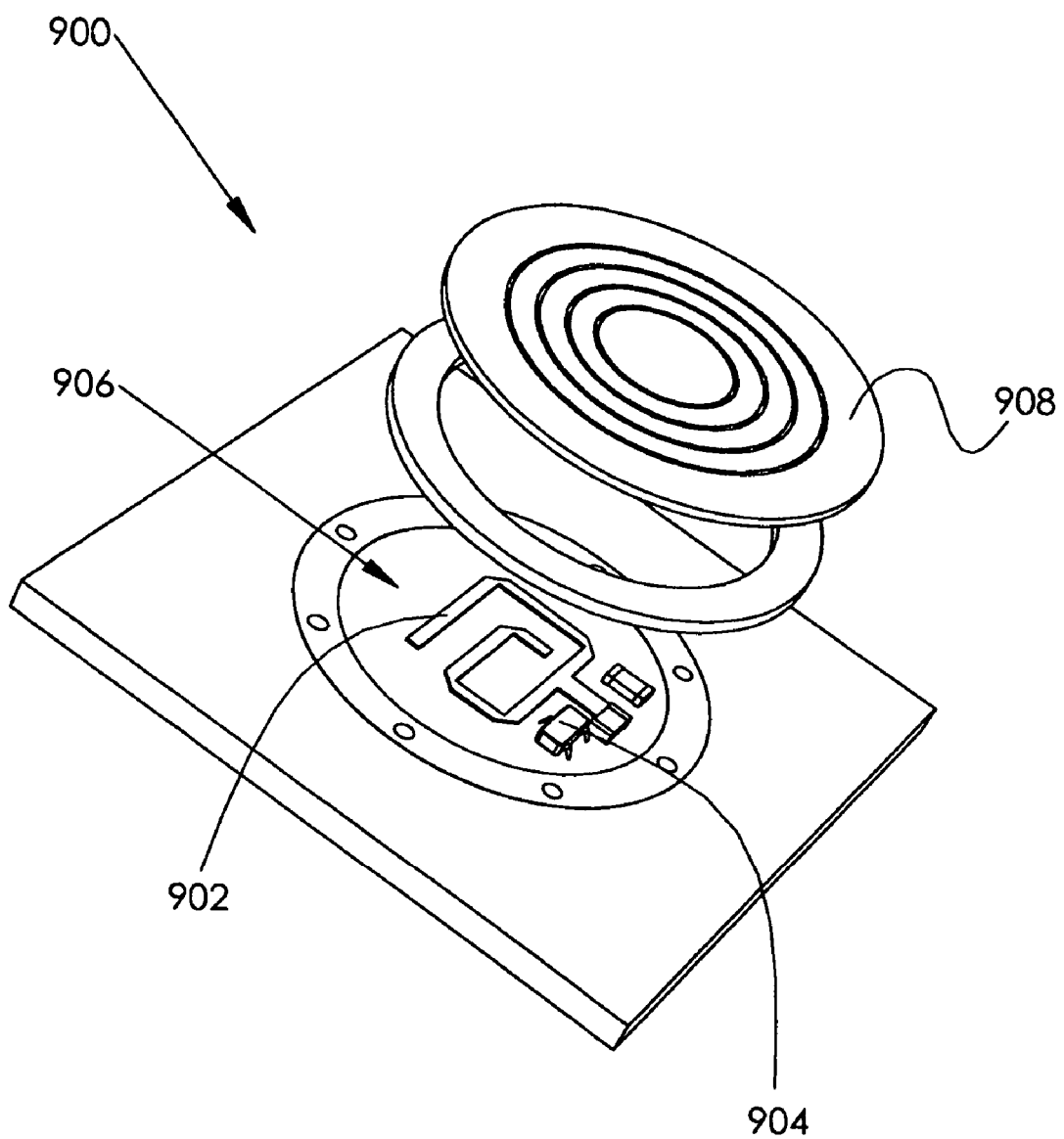
FIG. 9 is an exploded perspective view of one embodiment of a pressure sensor incorporating a microwave oscillator and a microwave resonator as the sensing element.

The basic structure described herein can also be adapted for pressure sensing applications. The various embodiments of the pressure sensor described herein offers enhanced resistance to problems associated with temperature. FIG. 9 illustrates a pressure sensor 900 adapted to respond to a resonator element 902 and an associated oscillator circuit 904 disposed within the volume 906 of the enclosure. Pressure on the outside of the diaphragm 906 causes it to flex inwardly into the enclosure thereby reducing the volume 904 of the enclosure and the distance between the diaphragm 908 and the resonator element 902. The resonant frequency of the pressure switch 900 varies with the distance between the diaphragm 908 and the resonator element 902 and the oscillator circuit 902 is responsive to the resonant frequency of the resonant cavity. The resonant frequency represents an instant pressure value. Thus, the pressure sensor 900 is capable of variable pressure measurement meaning that it is capable of identifying an instant pressure value rather than being limited to indicating when a certain set-point threshold has been crossed.

Those skilled in the art will recognize that various sizes, geometries, and types of resonator elements can be employed without departing from the scope and spirit of the present invention. For exemplary purposes, it will be understood that both stripline and microstrip resonators can be used. A stripline resonator is typically symmetrical with a ground plane on each side of the resonator. The ground planes associated with the stripline resonator illustrated include the diaphragm and a ground plane disposed on the opposing face of the circuit substrate. The minor differences in the relative distance between the stripline resonator and each ground plane can be accounted for without disrupting the function of the stripline resonator. A microstrip resonator is typically half of the dimensions of the stripline resonator and relies on a single ground plane, which is disposed on one side of the microstrip resonator, such as on the opposing face of the circuit substrate. Various geometries, for example, ring, hairpin, and line resonators are suitable for use. Further, acceptable resonator elements are sized according to the desired frequency response characteristics. The resonator element can be a trace on the circuit substrate or can be a separate component connected to the circuit substrate or pressure sensor.

The oscillator circuit 904 is selected to work within a frequency range of interest, including but not limited to radio frequency, microwave frequency, and low frequency. In the illustrated embodiment, the oscillator circuit 904 is disposed within the volume 904 of the enclosure to implement a self-contained pressure sensor. However, the oscillator circuit 904 may alternatively be positioned outside of the enclosure without departing from the scope and spirit of the present invention.

The resonant cavity has a known field distribution at a given ambient pressure. A small perturbation in the resonant cavity causes the resonant frequency to shift. Generally, a small perturbation in a cavity wall has an varying effect on each of the electric energy and the magnetic energy of the cavity. The shift in resonant frequency occurs in an attempt to equalize the electric and magnetic energies. One expression defining the relationship of the cavity volume to the volume perturbation is:

$$\frac{\Delta f_r}{f_r} = \frac{\int_{\Delta V}(\mu H^2 - \varepsilon E^2)dV}{\int_V (\mu H^2 - \varepsilon E^2)dV} = \frac{\int_{\Delta V}(\mu H^2 - \varepsilon E^2)dV}{4U}, \qquad (1)$$

where $\Delta V$ is the volume perturbation and $\Delta f_r$ is the change in the resonant frequency. The electrical energy and magnetic energy will vary depending upon the shape and volume of the resonant cavity and the operation mode. Those skilled in the art will recognize other accepted definitions associated with resonance changes. With the inclusion of the resonator element, the pressure sensor 900 can be adapted to be responsive to the resonant frequency of the cavity, to the resonant frequency of the resonator element, or to a composite resonant frequency influenced by both the cavity and the resonator element.

In an alternate embodiment, the resonator element is omitted leaving the resonant frequency tied solely to the volume of the enclosure, which serves as a resonant cavity. The frequency of the oscillator circuit varies with the volume of the enclosure, which is dependent on the flex of the diaphragm. As the volume of the enclosure is reduced, the resonant frequency of the enclosure changes.

In another embodiment, the resonant frequency pressure sensor includes an adjustment member that is inserted into the cavity through an opening in the enclosure. By varying the amount of insertion, the volume of the enclosure is modified. This permits modification of the resonant frequency of the cavity independent of the effects of flex on the diaphragm. One embodiment of the adjustment member utilizes a screw that can be adjustably inserted or retracted as desired without requiring the adjustment member to be permanently secured. In another embodiment, the adjustment member is a pin that is inserted to set a desired resonant frequency and then substantially permanently secured through a method such a soldering. Those skilled in the art will recognize other structures that can be effectively used for the adjustment member that can be temporarily or permanently secured in the enclosure and other methods that can be used to the achieve the desired temporary or permanent fixation without departing from the scope and spirit of the present invention. In one embodiment, the adjustment member is a pin of temperature stable resistive matter, or resistive pin. The resistive pin acts as a direct pressure to resistance sensor that can be electronically calibrated or combined with mechanical calibration.

The variable pressure measurement of the pressure sensor is measured in units of relative pressure (psir) to a reference pressure characterized by the resonant frequency of the cavity at a known state. The pressure sensor is calibrated by signaling the controller to set the frequency at a known state. In one embodiment, the selected frequency is the frequency associated with the mid-range of a known applied pressure during factor calibration. A simple frequency measuring circuit or frequency counter is implemented to convert the frequency measurement to a pressure value, which allows for variable pressure measurement.

In a further embodiment, the diaphragm is configured to engage a piezoelectric element, for example, a piezoelectric crystal, within the pressure sensor. When the diaphragm presses, stresses, or otherwise alters the piezoelectric element, the low frequency structure resonance is varied. This allows for responses at frequencies below the recognized floor of the radio frequency spectrum. The piezoelectric pressure sensor is well-suited for low power operation and can be implemented in an integrated circuit.

Other embodiments of the pressure sensor incorporate a filler material within the cavity. The filler material is a fluid exhibiting a property that can be varied by a change in volume of the cavity or by the deflection of the diaphragm. The fluid typically has dielectric or electrolytic characteristics. This property is generally measurable through techniques known to those skilled in the art. Examples of filler material properties that can be influenced to sense a change in pressure include changes in capacitance, resistance, inductance, and voltage.

Figure 10:
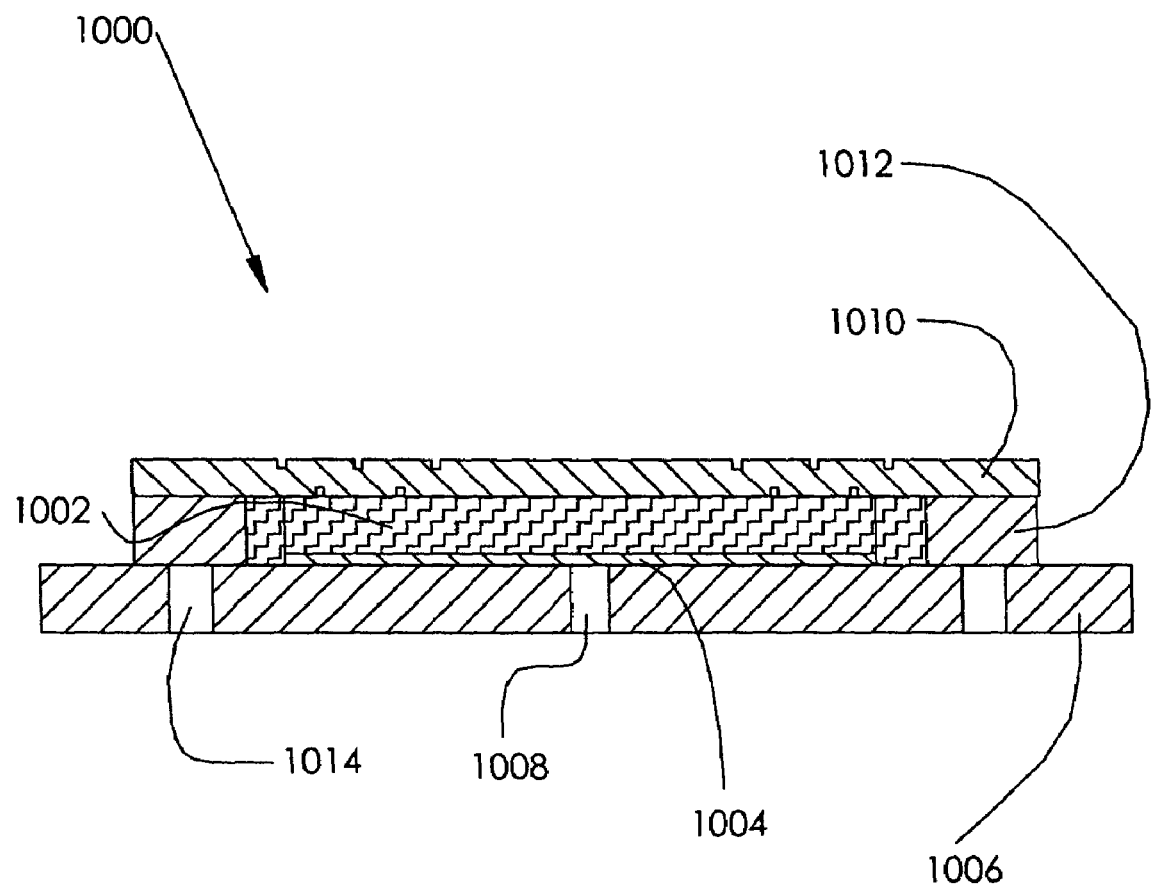
FIG. 10 is a sectional view of one embodiment of a pressure sensor adapted for the sensing of pressure changes using the capacitive property of a dielectric filler material.

FIG. 10 illustrates a cross section of a pressure sensor 1000 adapted for the sensing of pressure changes using the capacitive property of a dielectric filler material. The dielectric filler material is typically a conductive material from which a capacitance can be measured and exhibiting a variable capacitance related to changes in volume or pressure. Examples of suitable filler materials include a conductive rubber material or a dielectric fluid, including air.

A circuit substrate 1006 provides support for the pressure sensor 1000. An electrically conductive ring 1012 and a diaphragm 1010, together with the circuit substrate 1006 form an enclosure which defines a volume 1002. A filler material 1002 substantially fills the volume of the pressure sensor 1000. A plate 1004 disposed on the circuit substrate 1006, together with diaphragm 1010, form the plates of a capacitor. The dielectric properties of the filler material 1002 influence the charge between the plates 1004, 1010 of the capacitor. When the diaphragm 1010 is flexed, it interacts with the filler material 1002 and, with the change in the separation distance between the plates 1004, 1010, the capacitance changes. This variation in capacitance provides a measurable property for the sensing of a change in pressure. A plurality of vias 1008, 1014 allow for an electrical connection to each of the plates 1004, 1010 of the capacitor. Other methods electrical connection will be appreciated by those skilled in the art.

A simple capacitance measurement circuit, known to those skilled in the art, is used to measure the capacitance of the filler material. The measured capacitance value represents the pressure value. This capacitance can also affect an oscillator circuit at resonance where the change in capacitance corresponds to a change in the pressure to which the sensor is exposed. Those skilled in the art will recognize other circuits which can be used to measure the capacitance without departing from the scope and spirit of the present invention. It will be further appreciated by those skilled in the art that numerical storage methods lend themselves to firmware calibration allowing for the development of a highly integrated circuit. For example, associated EEPROM cells placed in parallel with the pressure sensor can be set on or off to offer a physical trim of the capacitance providing a method of fine tuning the capacitance measurement.

Figure 11:
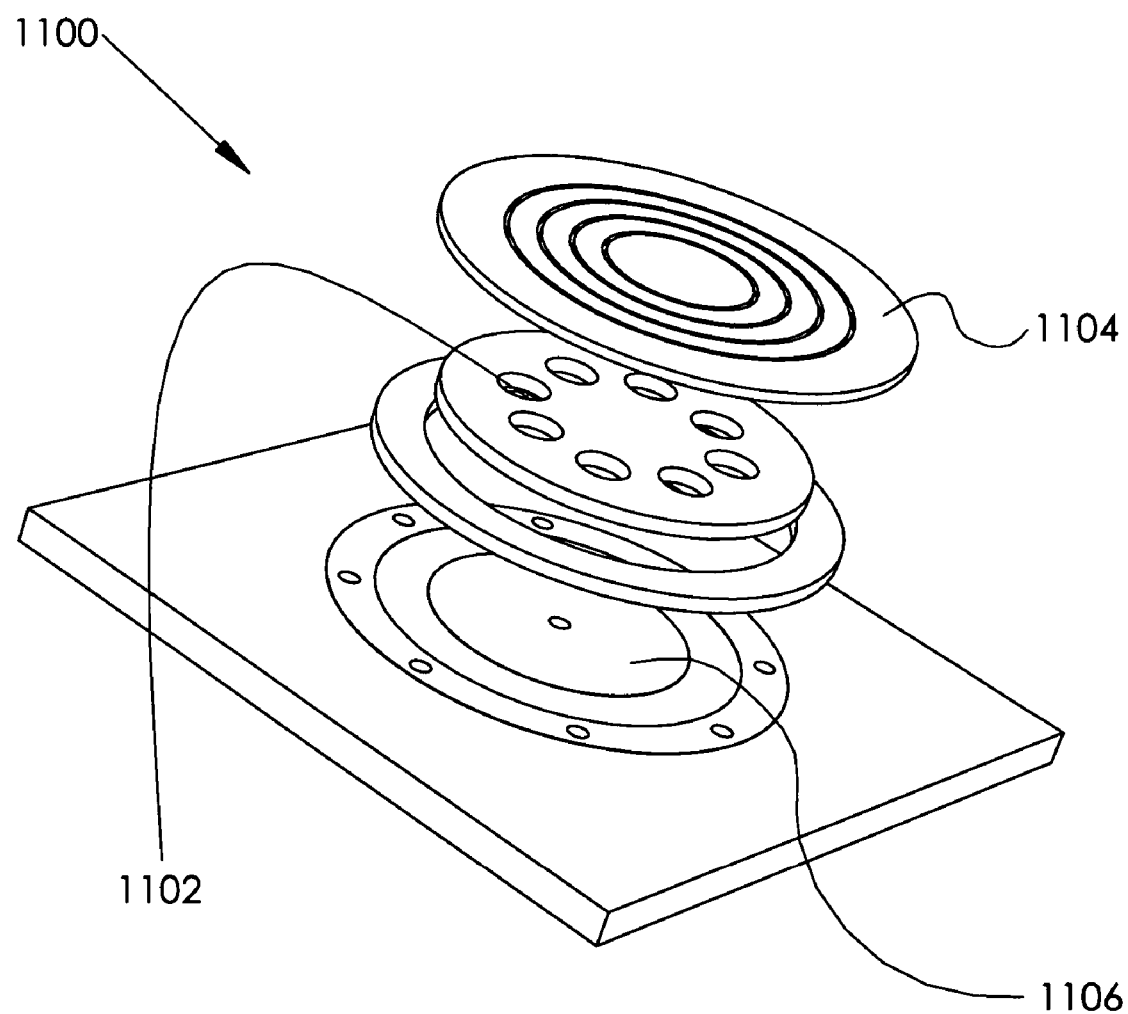
FIG. 11 is an exploded perspective view of a one embodiment of a pressure sensor incorporating an electrically conductive rubber pill as a dielectric filler material for the measurement of pressure based on resistivity changes induced by the deflection of the diaphragm.

In a similar manner, the resistance of a filler material can be measured to determine the pressure on the sensor. Examples of suitable filler materials include an electrically conductive rubber material or a dielectric fluid exhibiting a variable resistance under pressure or volume fluctuations. The filler material substantially fills the volume of the enclosure. When the diaphragm is flexed, it interacts with the filler material to alter the resistance of the filler material. FIG. 11 illustrates one embodiment of a pressure sensor 1100 including an electrically conductive rubber pill 1102 disposed within the enclosure. The electrically conductive rubber pill 1102 presents connects the diaphragm 1104 and a conductor 1106. A simple resistance measurement circuit known to those skilled in the art is used to measure the resistance of the filler material. The measured resistance value represents the pressure value. This resistance can also affect an oscillator circuit at resonance where the change in resistance corresponds to a change in the pressure to which the sensor is exposed. In the illustrated embodiment, the rubber pill includes one or more voids to allow expansion.

Figure 15:
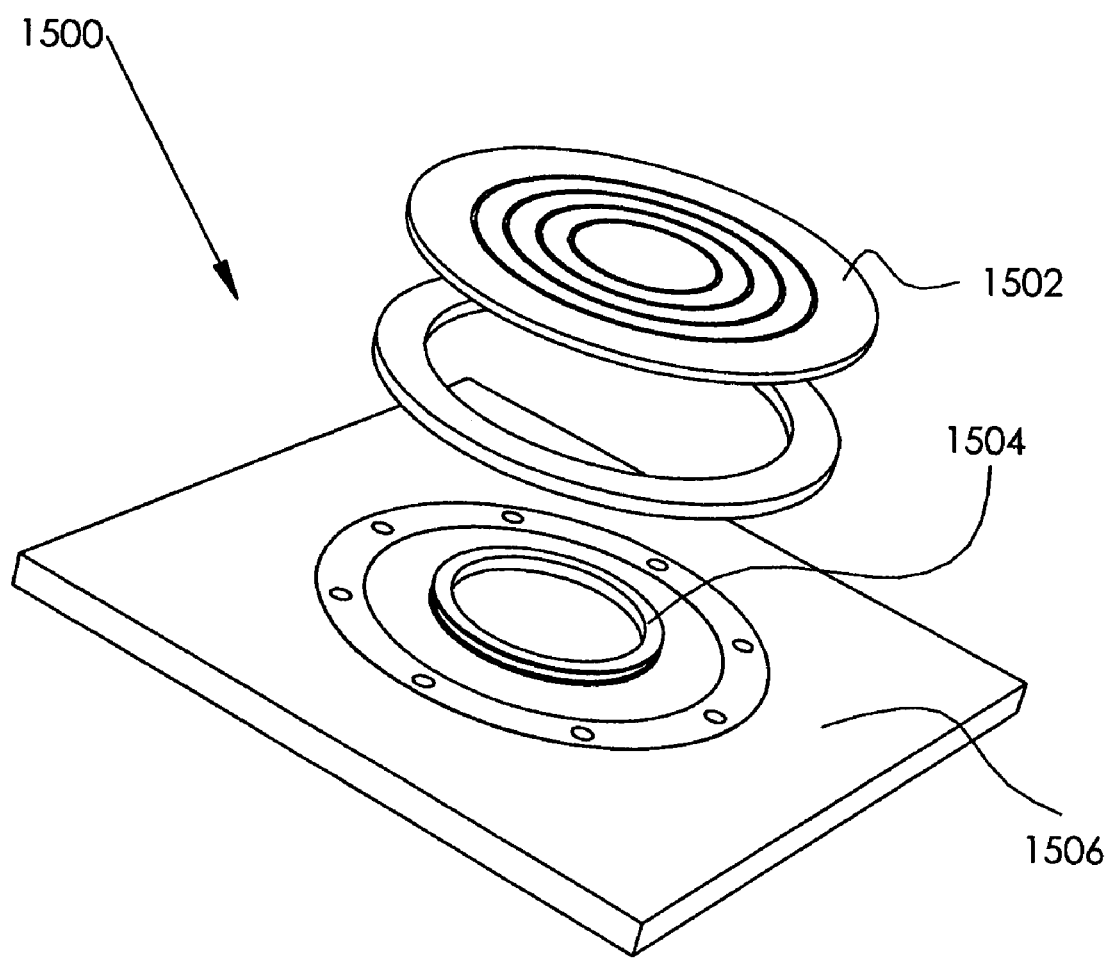
FIG. 15 is an exploded perspective view of a one embodiment of a pressure sensor incorporating an inductor for the measurement of pressure based on inductance changes induced by the deflection of the diaphragm.

FIG. 15 illustrates an alternate embodiment of a pressure sensor 1500 wherein the inductance is measured to determine the pressure on the sensor. An oscillator (not shown) generates an inductive field within the pressure sensor. When flexed, the diaphragm 1502 perturbs the inductive field of present in the cavity. The illustrated embodiment includes an inductive coil assembly 1504 disposed on the circuit substrate 1506. The inductive coil assembly 1504 is a bobbin having a coil of wire wrapped around it. In an alternate embodiment, the underside of the diaphragm 1502 includes an attachment, for example a dome, that is adapted to extend closer to or into the inductive coil assembly 1504 to enhance the perturbation of the inductive field. In yet another alternative embodiment, the inductive coil assembly is replaced by a monolithic flat inductor disposed on the circuit substrate. A simple inductance measurement circuit, for example a frequency counter, known to those skilled in the art is used to measure the changes frequency of the inductive field. The measured inductance value represents the pressure value.

The signal produced by the various embodiments of the pressure sensor is processed according to the demands of the application where the pressure sensor is installed. In applications requiring little precision and a simple visual indication of relative pressure, the output of the pressure sensor can be used to directly drive an indicator, such as a light-emitting diode bar. In applications requiring more precision or additional processing, the output of the pressure sensor can be interfaced with a processing device. A typical implementation involves feeding the output of the pressure sensor into a signal conditioning circuit. The signal conditioning circuit conditions the pressure sensor output into form that is useful for further processing. Such processing generally includes amplification of the signal and can include filtering. In an analog circuit application, the conditioned signal is fed into a comparator circuit and the output of the comparator circuit serves as a decision point in determining further action. In a digital circuit application, the conditioned signal is then fed into an analog-to-digital converter and the digital output is generally acted upon a digital processing device, such as a microcontroller, a digital signal processor, or a microprocessor, to perform additional functions or provide detailed outputs. The pressure output can be logged and stored for long term monitoring of a process or for later, post-processing analysis.

Figure 12:
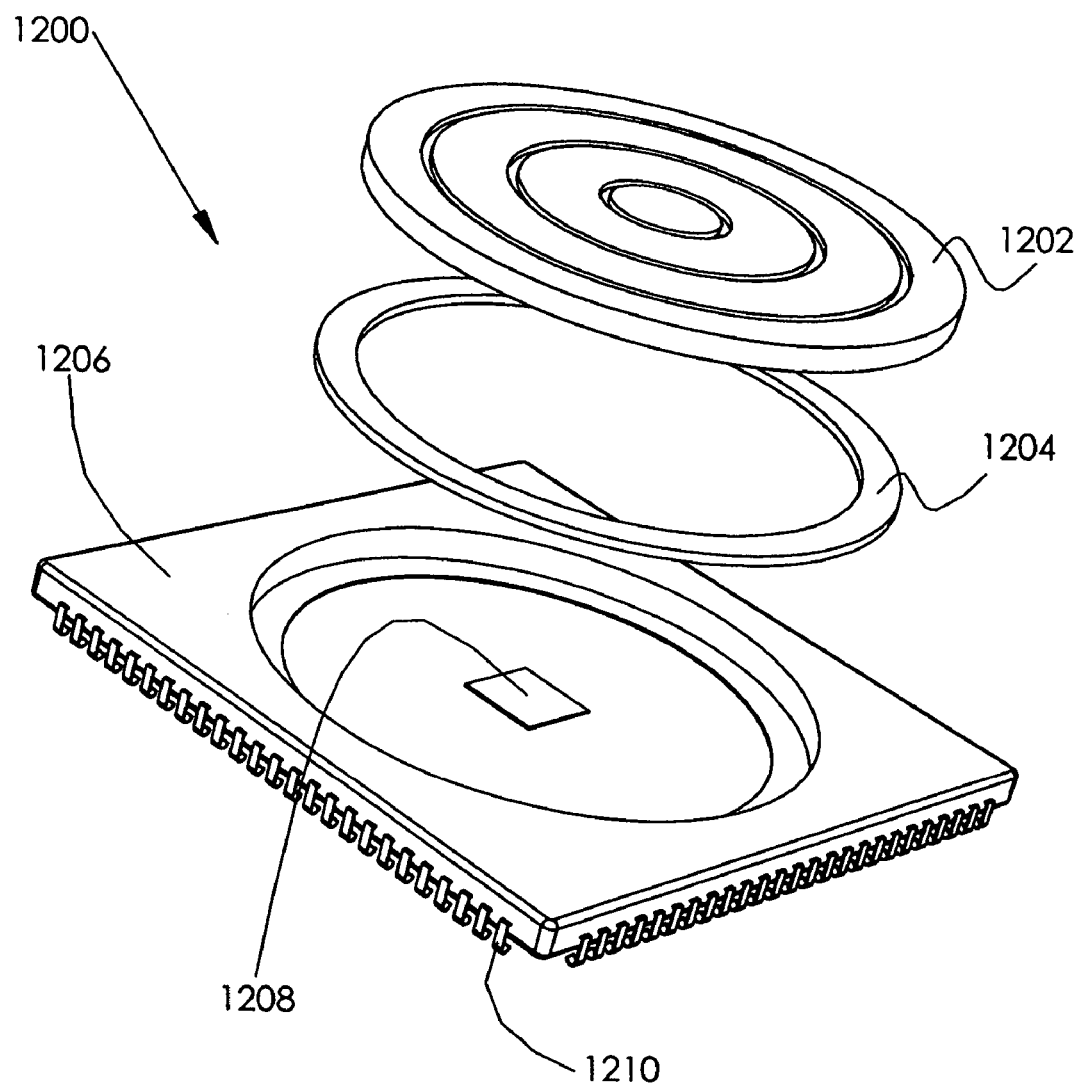
FIG. 12 is an exploded perspective view of one embodiment of a pressure sensor fabricated in an integrated circuit package incorporating a generic sensing element.
Figure 13:
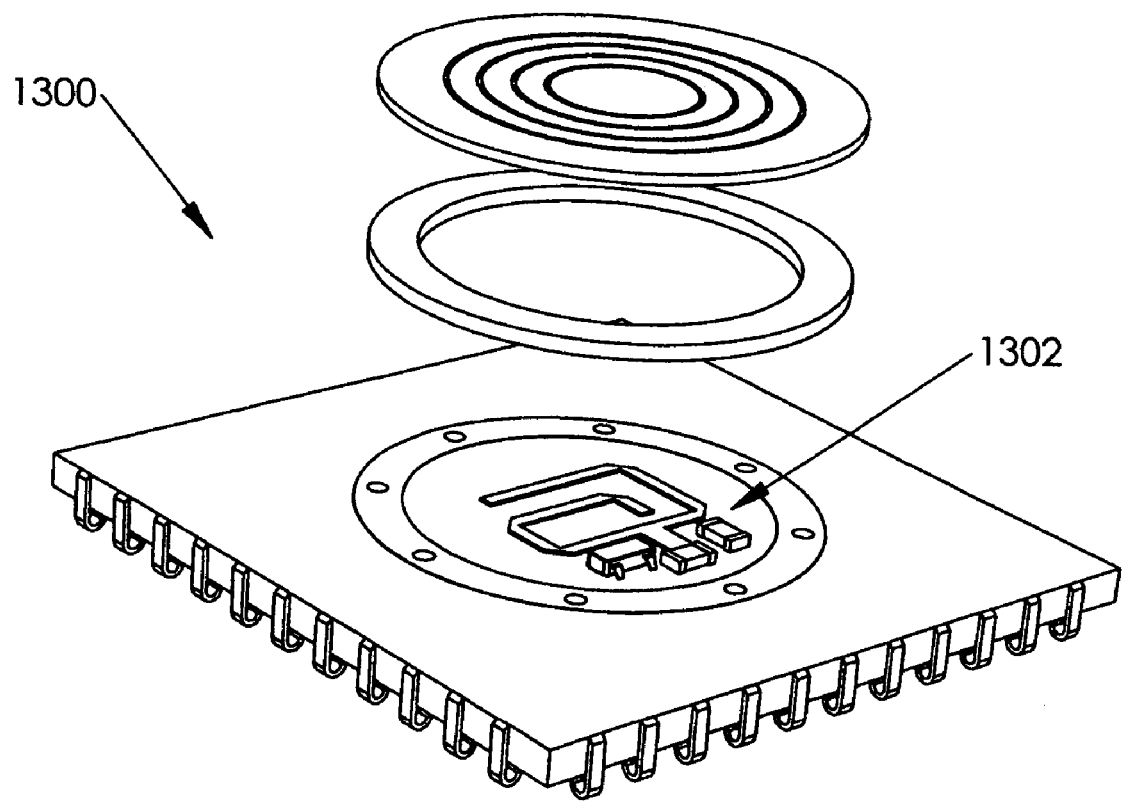
FIG. 13 is an exploded perspective view of one embodiment of a pressure sensor fabricated in an integrated circuit package incorporating a microwave resonance circuit for the measurement of pressure.

FIG. 12 is an exploded illustration of one embodiment of the pressure sensor 1200 fabricated in the form of a self-contained chip, or integrated circuit. A diaphragm 1202 and a ring 1204, if necessary, are stacked on a circuit substrate 1206 to build the pressure sensor 1200. In the illustrated embodiment, a sensing element 1208 is shown on the circuit substrate 1206 within the volume of the pressure sensor 1200. The circuit substrate 1206 includes a number of pins 1210 which can be electrically connected to the components of pressure sensor 1200 or other unrelated internal circuitry as desired. The pressure sensor 1200, via pins 1210, can be placed in physical and electrical communication with a separate circuit board using standard mating techniques, including but not limited to socketing and soldering. FIG. 13 illustrates an exploded view of one embodiment of a pressure sensor 1300 utilizing a microwave resonator circuit 1302 as the sensing element.

Figure 14:
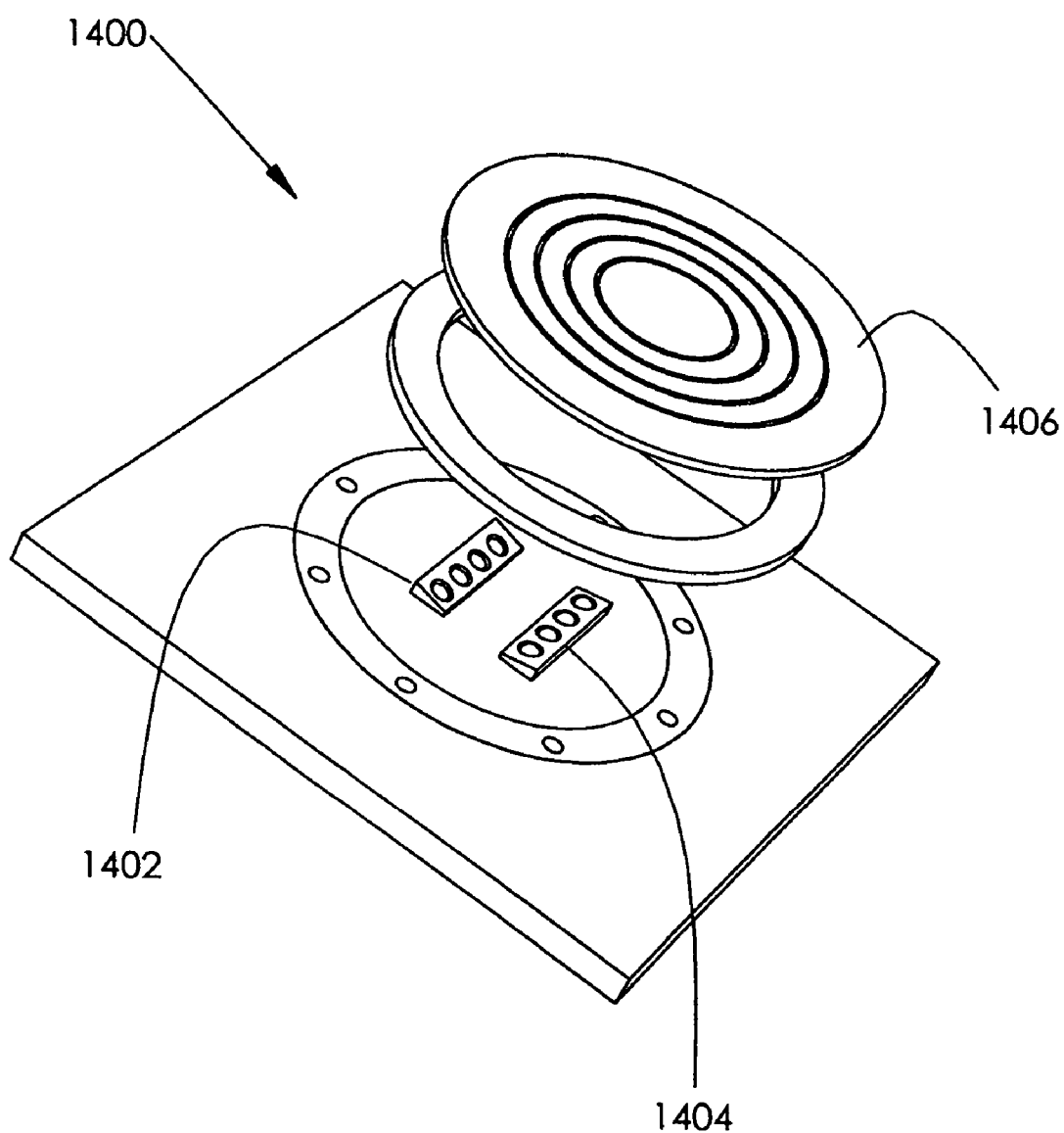
FIG. 14 is an exploded perspective view of one embodiment of a pressure sensor incorporating an optical sensor pair for the measurement of pressure using the effects on a beam by the deflection of the diaphragm.

Alternate embodiments of the pressure sensor utilizes photosensitive or "optical" technologies for sensing pressure. The photosensitive embodiments described herein are not intended to be limited to light in any one spectrum and various wavelengths of light, including but not limited to the visible, infrared, and ultraviolet spectrums, can be used without departing from the scope and spirit of the present invention. FIG. 14 illustrates an exploded view of one embodiment of an optical deflection pressure sensor 1400. The optical deflection pressure sensor 1400 detects changes in the deflection angle of a beam of light. The optical beam deflection pressure sensor includes at least one emitter element 1402 and at least one detector element 1404. The diaphragm is adapted so as to be reflective to the beam of light. The emitter element 1402 is disposed so that the emitted beam strikes the diaphragm 1406 and is reflected to the detector element 1404. The position at which the beam strikes the detector element 1404 is used to determine the deflection. Movement of the diaphragm 1406 in response to changes in the ambient pressure results in changes in the angle of deflection. The change in the angle of deflection provides an output that corresponds to the change in pressure. Those skilled in the art will recognize that the emitter element 1402 and the detector element 1404 can be fabricated using single elements, an array of discrete elements, or from a single element configured in multiple sections. While the diaphragm 1406 described herein is inherently reflective, those skilled in the art will appreciate that the diaphragm may be polished to enhance the reflectiveness or a reflective film or member can be secured to the underside of the diaphragm without departing from the scope and spirit of the present invention.

A similar embodiment detects changes in the intensity of the reflected beam. The emitter and detector are arranged such that under the default pressure the full intensity of the beam strikes the detector. Changes in the ambient pressure cause deflection of the diaphragm that, in turn, changes the deflection of the beam. As the deflection of the beam changes, the energy of the beam incident on the detector varies. The energy value, which is the output of the pressure sensor, corresponds to the change in pressure. In another alternate embodiment, an extension, which is typically angled, on the diaphragm serves to interrupt members of an array of direct beams to detect position.

Finally, in the area of optical technologies, another embodiment uses optical resonance to measure the change in pressure. The optical resonance embodiment includes an arrangement of mirrors within the cavity. A resonant wavelength of a light source from an emitter is established within the cavity. The resonant wavelength seen by the detector varies with deflection of the diaphragm. One technique for optical resonance pressure measurement uses the Fabry-Perot cavity sensor. The Fabry-Perot method is extendable to the pressure sensor structure described herein.

In an alternate embodiment, a pressure sensor adapted for measuring the ambient pressure in any of the embodiments described above also includes the features of the pressure switch described herein. The set-point pressure switch adds a separate pressure detection circuit that can operate as a fail-safe in the event of a malfunction with regard to the ambient pressure measure. The combination pressure sensor and pressure switch provides an integrated under a single diaphragm. The redundant sensing allows for an instantaneous switch response without the need to rely on another circuit or device to produce a response based upon a logical analysis of the pressure sensor output. The combination pressure sensor and pressure switch implementation is extremely robust, self-testing, and redundant without requiring any additional circuit substrate real estate. Further, the combination pressure sensor and pressure switch adds additional functionality allowing for a broader range of applications where the combination pressure sensor and pressure switch can be used effectively.

Presently, monolithic pressure sensors currently used to measure tire pressure. The prior-art monolithic pressure sensors are subject to contamination found inside an automobile tire, which can cause undesired operation or failure. In an effort to prevent contamination, some monolithic pressure sensors include small filters between the orifice through which ambient pressure is applied and the sensor itself. However, the orifice filters cannot prevent malfunction from moisture or submersion under fluid.

Figure 16:
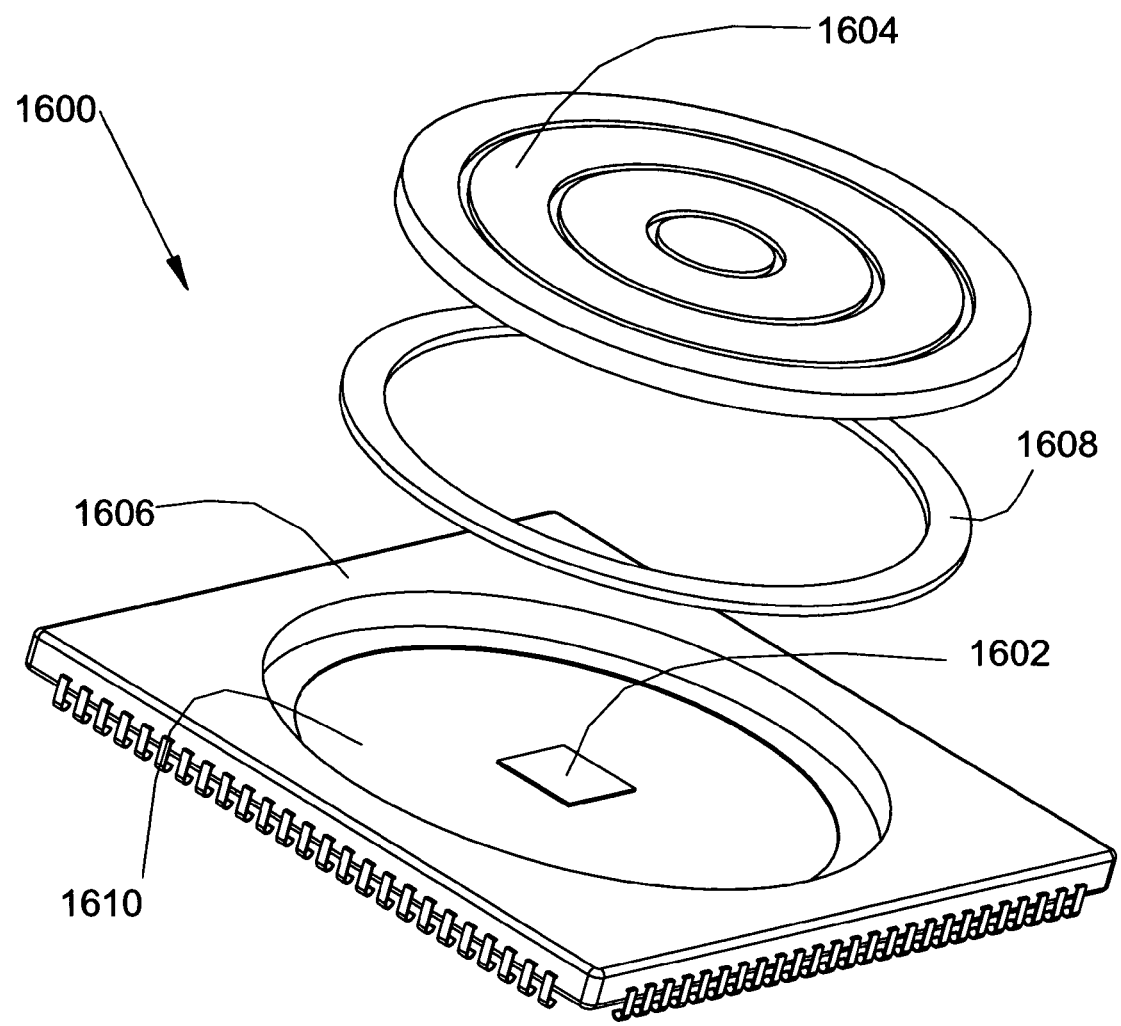
FIG. 16 is an exploded perspective view of a one embodiment of a pressure sensor with pressure translation.

FIG. 16 illustrates a pressure translator 1600 according to the present invention. In one embodiment, the pressure translator 1600 provides a protective housing for a pressure sensor 1602, such as a monolithic integrated circuit sensor. In one embodiment, the pressure sensor 1602 is a packaged circuit. In another embodiment, the pressure sensor 1602 is in die form (exposed) with an integral diaphragm. The pressure translator 1600 includes a diaphragm 1604 and a base 1606. In the illustrated embodiment, the base 1606 is a circuit substrate defining a cavity 1610 open at one end. The diaphragm 1604 covers the open end of the cavity 1610 substantially sealing the cavity 1610. In one embodiment, the diaphragm 1604 is secured directly to the base 1606. In the illustrated embodiment, a spacer 1608 of a selected thickness is disposed between the diaphragm 1604 and the base 1606 to provide the desired amount of clearance to accommodate the enclosed pressure sensor 1602. In other embodiments, multiple spacers are used to achieve the desired clearance.

The pressure translator 1600 allows the pressure sensor 1602 to operate in a harsh environment. More specifically, the pressure translator 1600 encloses and protects the pressure sensor 1602 from solid and fluid contaminants. The pressure sensor 1602 remains isolated within the sealed interior 1610 of the pressure translator 1600. In one embodiment, the interior 1610 is hermetically sealed allowing the pressure translator 1600 to operate submerged in oil or water without interfering with the operation of the pressure sensor 1602.

The pressure translator 1600 operates by transferring the ambient pressure to the cavity 1610. The diaphragm 1604 deflects into the cavity 1610 increasing the pressure inside the cavity 1610 thus increasing pressure on the pressure sensor 1602 and indirectly transferring or translating the outside ambient pressure to the pressure sensor 1602.

Figure 17:
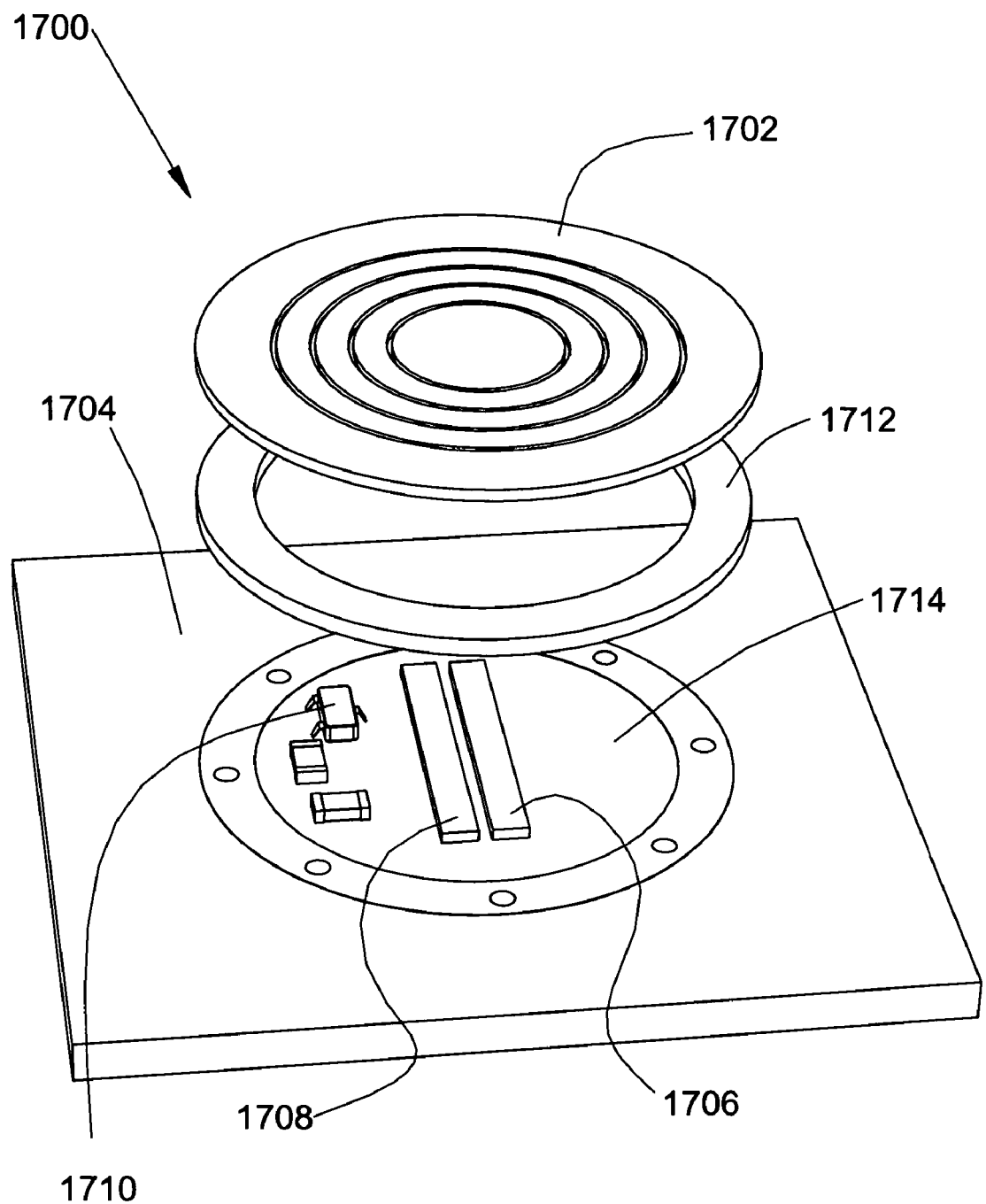
FIG. 17 is an exploded perspective view of a one embodiment of a pressure sensor having a two-element coupling structure.

FIG. 17 shows a basic two-element coupling structure used as the sensing element of a pressure sensor 1700. The pressure sensor 1700 has a diaphragm 1702 attached to a base 1704, such as a circuit substrate. In the illustrated embodiment, a spacer 1712 provides the desired amount of clearance to accommodate the enclosed pressure sensor. In other embodiments, multiple spacers are used to achieve the desired clearance. The base 1704 defines a cavity 1714, which is sealed by the diaphragm 1702. Disposed within the cavity 1714, are two coupled elements 1706, 1708. In one embodiment, the coupled elements 1706, 1708 are resonant elements. As the diaphragm flexes, the resonantly-coupled elements 1706, 1708 are detuned. The resonantly-coupled elements 1706, 1708 act as a band-pass filter and affect the optimal amplitude of a fixed-frequency source 1710 that is tuned to the resonantly-coupled elements 1706, 1708. The amplitude of the signal from the fixed-frequency source corresponds to the ambient pressure.

The coupled elements 1706, 1708 are non-resonant in other embodiments. However, the resonant coupled structure provides more sensitivity to a narrow range of diaphragm motion than the non-resonant embodiment. In other embodiments, multiple structures beyond two elements of varying geometry are cascaded to form coupling structures such as in hairpin filters that could be tuned to a different frequency with the deflection of the diaphragm thus affecting the amplitude of the fixed frequency source passed through it.

In other embodiments, the use of radio frequency (RF) or microwave frequencies is accomplished by manipulating the dielectric constant of the substrate. Increasing the dielectric constant while maintaining the same physical size and geometry for the pressure sensor elements reduces the resonate frequency. By manipulating both the element size and the dielectric constant, automotive wireless tire pressure sensor frequencies of 315 MHz can be realized.

Other embodiments use a non-stick, protective coating on the diaphragm and other exposed parts. In addition to corrosive protection, the protective coating provides for extended performance of the pressure sensor. An example of a suitable protective coating is Teflon® by DuPont. Certain contaminants, such as mud in large industrial equipment tires, have the ability to cover a pressure sensor and potentially reduce the effectiveness of a pressure sensor. While the pressure translator of the present invention is prevents contamination of the internal cavity and the actual pressure sensing mechanism, a build-up of contaminants potentially interferes with the movement of the diaphragm. Although the present inventors have found that a 0.5" thick build-up of mud dried on the diaphragm has little effect on pressure due to the scale and topology, the protective coating further increases the reliability of the pressure sensor/translator. The protective coating prevents contaminants from sticking to the diaphragm. Preventing the accumulation of contaminants prevents the corrosion of the diaphragm over time and the effects of large and/or heavier contaminants under high g-forces to affect the diaphragm. As a specific example, a substance that can cure and certainly affect performance, such as concrete, the protective coating does not allow the substance to adhere and freeze the operation of the diaphragm.

The diaphragm and surrounding structure act as an integrated RF shield if the RF section is integrated inside the sensor. Integrating the RF shield is beneficial for achieving certification of the pressure sensor from various certifying entities in both Europe and the United States.

Those skilled in the art will recognize that the logic described herein can be implemented in either hardware and/or software using any of the typical technologies used to implement control functions including discrete logic, application specific integrated circuits, custom integrated circuits, microcontrollers, microprocessors, and any combination thereof. Where circuit diagrams and block or flow diagrams of circuits have been illustrated, those skilled in the art will recognize that the diagrams are intended to illustrate the general concept and functionality of the device. Common circuit components that will be familiar to one skilled in the art of circuit design, such as power connections, feedback, trimming, and voltage regulation components, are not necessarily illustrated. A pressure switch and pressure sensor that is integrated into a circuit substrate has been shown and described. The pressure switch provides a low cost, easily manufactured, durable, simple-to-assemble device for detecting when an ambient pressure reaches a selected set point. The pressure sensor disclosed herein allows the measurement of the current ambient pressure on the pressure sensor. Various embodiments having a number of unique implementations, features, and functions have been described herein. Those skilled in the art will recognize that, unless mutually exclusive, the implementations, features, and functions can be combined without departing from the scope and spirit of the present invention. One example of function that can be used in combination with each of the embodiments described is the variable calibration system.

A number of various features and embodiments of both pressure switches and pressure sensors have been described herein. While all combinations of features and embodiments have not been expressly described, it will be understood that the various features and embodiments can be combined to achieve the desired pressure sensor or pressure switch without departing from the scope and spirit of the present invention. For example, the adjustment of the cavity volume using an adjustment member, the resistive pin, and the electrical and manual calibration techniques are applicable to all embodiments described herein.

While the present invention has been illustrated by description of several embodiments and while the illustrative embodiments have been described in detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. A pressure translator responsive to an ambient pressure, said pressure translator comprising:
   an enclosure having an open end and defining a cavity;
   a diaphragm covering said open end and forming a fluid-tight seal with said enclosure, said diaphragm responsive to an ambient pressure external to said enclosure, said cavity having an internal pressure, the ambient pressure being translated to said internal pressure by a deflection of said diaphragm, said internal pressure having a correlation to the ambient pressure; and
   a pressure sensor disposed within said cavity, said pressure sensor being responsive to said internal pressure.

2. The pressure translator of claim 1 wherein said diaphragm and enclosure cooperate to form an internal chamber, said internal chamber being fluid tight, said internal pressure existing within said internal chamber.

3. The pressure translator of claim 2 wherein said internal chamber has a static concentration of fluid therein.

4. The pressure translator of claim 1 wherein said diaphragm has an external surface exposed to the ambient pressure and an internal surface exposed to said internal pressure.

5. The pressure translator of claim 4 wherein said diaphragm is adapted to flex as the ambient pressure exerted on said diaphragm external surface changes relative to said internal pressure.

6. The pressure translator of claim 1 wherein said internal pressure measured by said pressure sensor translates to a corresponding ambient pressure thereby allowing indirect measurement of the ambient pressure.

* * * * *